United States Patent [19]

Chevance et al.

[11] Patent Number: 5,459,515
[45] Date of Patent: Oct. 17, 1995

[54] METHOD FOR DUAL-STANDARD CODING OF VERY LOW DATA-RATE IMAGES AND CODER-DECODER FOR IMPLEMENTING THIS METHOD

[75] Inventors: Christophe Chevance, Rennes; Dominique Thoreau, Cesson-Sevigne, both of France

[73] Assignee: Thomson-CSF, Puteaux, France

[21] Appl. No.: 140,128

[22] PCT Filed: Mar. 16, 1993

[86] PCT No.: PCT/FR93/00262

§ 371 Date: Nov. 8, 1993

§ 102(e) Date: Nov. 8, 1993

[87] PCT Pub. No.: WO93/19557

PCT Pub. Date: Sep. 30, 1993

[30] Foreign Application Priority Data

Mar. 17, 1992 [FR] France ................................ 92 03163

[51] Int. Cl.⁶ .................................................. H04N 7/32
[52] U.S. Cl. ............................................ 348/402; 348/419
[58] Field of Search ..................................... 348/401, 405, 348/409, 412, 415, 419, 438, 402; H04N 7/137

[56] References Cited

U.S. PATENT DOCUMENTS

| 4,965,667 | 10/1990 | Trew et al. . | |
| 5,150,432 | 9/1992 | Ueno et al. | 348/438 |
| 5,193,002 | 3/1993 | Guichard et al. | 348/409 |
| 5,214,506 | 5/1993 | Lin et al. | 348/415 |
| 5,253,058 | 10/1993 | Gharavi | 348/409 |

FOREIGN PATENT DOCUMENTS 0374547 6/1990 European Pat. Off. .
2238444 5/1991 United Kingdom .

OTHER PUBLICATIONS

IEEE Transactions on Consumer Electronics, vol. 36, No. 3, Aug. 1990, New York, USA, A. Artieri et al: "A Chip Set Core for Image Compression", pp. 395–402.
International Broadcasting Convention (IBC), Brighton, UK, Sep. 23–27, 1988, London, T. Trew et al: "Spatially Adaptive Sub–Branches for HD–MAC", pp. 66–69.

Primary Examiner—Tommy P. Chin
Assistant Examiner—Richard Lee
Attorney, Agent, or Firm—Oblon, Spivak, McClelland, Maier, & Neustadt

[57] ABSTRACT

A method for dual-standard coding of very low data-rate images and a coder-decoder system for implementing the method, wherein images can be transmitted with low spatial "Quarter of Common Intermediate Format" (QCIF) resolution and with high time resolution according to a first standard, or with high spatial "Common Intermediate Format" (CIF) resolution and low time resolution according to a second standard. In the method and system, the coding of the images includes calculating the mean value of the quantification steps used by a quantifier circuit, comparing the calculated mean value with a first predetermined threshold value and with a second predetermined threshold value higher than the first threshold value, and, chronologically, coding the images in the first standard when the mean value of the quantification steps is lower than the first predetermined threshold value, then coding the images in the first standard as long as the mean value of the quantification steps is lower than the second predetermined threshold value, then coding the images in the second standard as long as the mean value of the quantification steps is higher than the second predetermined threshold value, then coding the images in the first standard when the mean value of the quantification steps is lower than the first predetermined threshold value.

8 Claims, 3 Drawing Sheets

METHOD FOR DUAL-STANDARD CODING OF VERY LOW DATA-RATE IMAGES AND CODER-DECODER FOR IMPLEMENTING THIS METHOD

FIELD OF THE INVENTION

The present invention relates to a method for dual-standard coding of very low data-rate images and a coder-decoder for implementing this method.

It applies particularly to the production of differential coding devices or "CODECs" at data rates lower than 64 Kbits.

DISCUSSION OF BACKGROUND

In conventional "CODECs" the transmission of moving images at very low data rates requires, in addition to employing a device for compression of the transmitted data, developing techniques for limiting the spatial and time resolution of the image signal. The limitation of the spatial resolution is obtained by sub-sampling the image in the vertical and horizontal directions. In this field it is known to use the CIF and QCIF formats, which are respectively the abbreviations of 37 Common Intermediate Format" and "Quarter of Common Intermediate Format". In the CIF format the number of points per line in luminance is equal to 352, the number of points per line in chrominance is respectively 176 for the Dr and Db components and the number of lines per image is 288 for the luminance signals and 144 respectively for the Dr and Db chrominance signals. In the QCIF format the number of points per line in luminance is 176, the number of points per line in chrominance is respectively 88 for the Dr and Db signals and the line number per image is 144 for the luminance signals and 72 respectively for the Dr and Db chrominance signals.

The limitation of the time resolution takes place quite simply by reducing the number of images transmitted with respect to the number of images delivered by the source. In practice, in the presence of an image source to the CIF standard at 25 Hz, ie. 25 images per second, the reduction may go as far as making it possible to code and transmit images at a frequency of 1.25 Hz.

The currently known coders and decoders generally conform to recommendation H261 version 11 1989 of the "CCITT specialist group on coding for visual telephony". In this context they are very well suited for data-rate applications which may vary by integer multiples of 64 Kbit/s. Below that it is difficult to produce coders which have both good spatial resolution and good time resolution. However, the transmission of images at very low data rate (32 Kbit/s, 16 Kbit/s, etc.) compels sub-sampling of the image signal to be carried out both in the spatial domain and in the time domain. Thus, the choice may be made to transmit images at 5 Hz in order to obtain spatial resolutions reduced to the QCIF format and at 1.25 Hz to obtain spatial resolution reduced to the CIF format, but in these conditions the CIF 1.25 Hz standard is rather intended for slowly moving images, while the other standard is more appropriate for scenes with a great deal of movement.

SUMMARY OF THE INVENTION

The object of the invention is to implement a method for dual-standard coding such that, in the presence of very slowly moving scenes, the spatial resolution is favoured by using the CIF format at 1.25 periods per second, while, for moving scenes, the time resolution is enhanced up to 5 periods per second to the detriment of the spatial resolution reduced to the QCIF format.

To this end, the subject of the invention is a method for differential coding of images at very low data rate, for transmitting images with low spatial QCIF resolution and with high time resolution according to a first standard, and images with high spatial CIF resolution and low time resolution according to a second standard, consisting in coding the images to be transmitted by means of a coding device including at least one quantifier circuit for a prediction error signal, characterized in that it consists:

in calculating the mean value of the quantification steps used by the quantifier circuit, in comparing the mean value obtained with a first predetermined threshold value and with a second predetermined threshold value higher than the first, and, chronologically, in coding the images in the first QCIF standard when the mean value of the quantification step is lower than the first predetermined threshold value, then in coding the images in the first standard as long as the mean value of the quantification step is lower than the second predetermined threshold value, then in coding the images in the second standard when the mean value of the quantification step is higher than the second predetermined threshold value, then in coding the images in the second standard as long as the mean value of the quantification step is higher than the first predetermined threshold value, then in coding the images in the first standard when the mean value of the quantification step is lower than the first predetermined threshold value.

The object of the invention is also a coder-decoder for implementing the abovementioned method.

The main advantage of the invention is that it allows a choice and a change of standard, which are carried out adaptively, during the data rate reduction procedure. The first standard is intended for slowly moving images while the second standard is more appropriate for scenes with a high degree of movement. Hence, in the first case, the reproduction of the spatial resolution is favoured whereas in the second case it is the transmission of the inter-image movement which is favoured by enhancing the time frequency of the images at the input to the coder. The criterion for changing standard which is based on comparison of the mean value of the quantification step, calculated on a coded image with two predetermined threshold values, makes it possible to obtain stable operation of the coder between the two coding modes at the moment of the change of standard. The thresholding, with hysteresis, which is thus carried out makes it possible, each time the coder is placed in a new standard, to inhibit the standard changing procedure during the transmission of the images. This allows the coder, in the context of coding at very low data rate, to adapt to the content of the scenes which it has to process by the use of the two abovementioned specific standards.

BRIEF DESCRIPTION OF THE DRAWINGS

Other characteristics and advantages of the invention will appear with the aid of the description which follows, given with respect to the attached drawings which represent.

DESCRIPTION OF THE PREFERRED EMBODIMENTS

Figure 1:
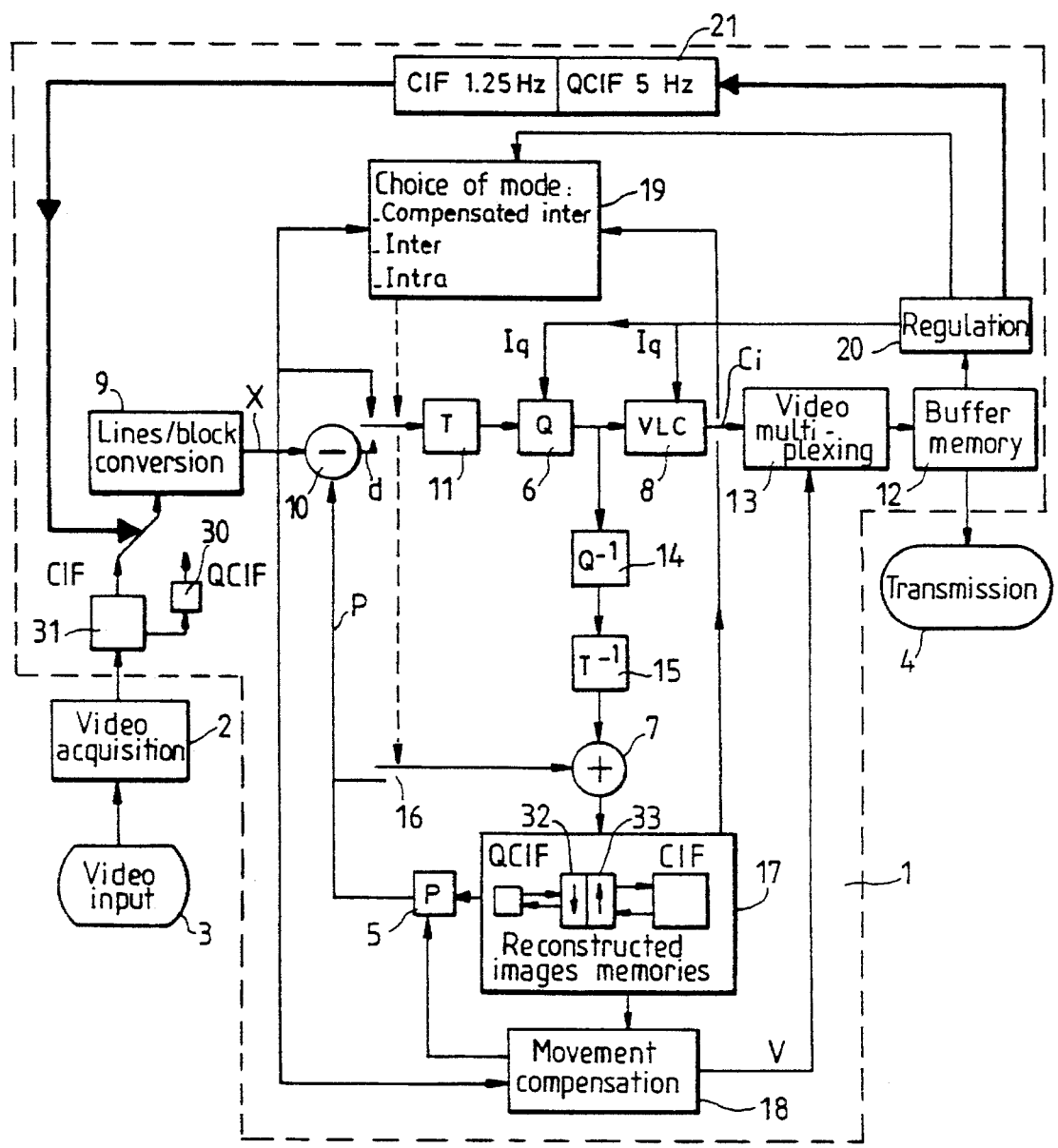
FIG. 1, an embodiment of a coder according to the invention.

Referring now to the drawings, wherein like reference numerals designate identical or corresponding parts throughout the several views, the coder according to the invention which is represented in FIG. 1 includes a coding device 1, represented within a closed, dashed line, coupled between a device for acquisition of video signals 2 originating, for example, from a television camera 3 and a transmission channel 4. The coding device 1 comprises, in a known way, an image predictor 5, a quantifier 6, a device for reconstruction of transmitted images 7, as well as a code allocator formed by a variable-length coding device 8. The video image to be transmitted is applied by the image acquisition device 2 through a line/block conversion device 9 to a first input of a subtracter circuit 10 whose other input is linked to the output of the image predictor 5. The output of the subtracter circuits 10 is linked to the input of the quantifier 6 via a cosine transform calculating device 11. The predictor 5 delivers a prediction value p to the first input of the subtracter circuit 10. Each image value to be coded, x, is reduced by its prediction value p applied in the form of the difference d=X-p to the input of the quantifier 6 after having been transformed by the cosine transform calculating device 11. To each quantification level, the code allocator 8 associates a code $C_i$ which is stored in a buffer memory 12 before being transmitted onto the transmission channel 4. The multiplexing circuit 13 carries out the transmission of the codes $C_i$ into the buffer memory 12. The quantified signal obtained at the output of the quantification circuit 6 is applied to a first input of the reconstruction circuit 7 via a dequantification circuit 14 and via an inverse cosine transform calculating device 15. The second input of the reconstruction circuit 7 is linked to the output of the prediction circuit 5 via a routing circuit 16. The image samples reconstructed by the image reconstruction circuit 7 are stored within an image memory 17. These samples are next applied to the prediction circuit 5 via a movement compensation device 18. A control device 19 allows mode switchings to be carried out into three coding modes which are an intra-image coding mode, an inter-image coding mode according to which the difference between a current block of the image to be coded and its corresponding block in the preceding image is coded, and a movement-compensated inter-image coding mode in which the difference between the current block and the displaced block in the preceding image, representing the best prediction, is coded. According to the fill state of the buffer memory 12, the coefficients of the image blocks which are transformed by cosine transform are quantified by the quantifier 6 and dequantified by the dequantifier 14 with a quantification step which is calculated by a regulation stage 20. The variable-length coding which is carried out by the code allocator 8 matches the codewords to the statistical properties of the information to be transmitted. Once coded, the coefficients are multiplexed with other information representing, for example, the type of coding used, the displacement vectors in compensated mode, etc., and the whole is transmitted to within the buffer memory 12. According to the fill state of the buffer memory 12 the quantification of the coefficients is done more or less coarsely so as to obtain a regulated data rate. The movement estimator 18 uses the current image block and compares it to blocks in the image memory 17 which contains the reconstructed preceding image. This memory receives the pixels reconstructed by the reconstruction device 7 after quantification and inverse transforming of the coefficients. Once the displacement has been estimated, the movement compensation stage 18 transmits a coded movement vector "V" to the multiplexer 13 as well as a displacement value to the predictor 5 so as to extract the displaced block in the preceding image in order to calculate and code the difference between the current block and its prediction. The coder which is thus represented in FIG. 1 makes it possible to carry out coding a priori, that is to say to decide on the coding mode before proceeding to the coding proper.

Figure 2:
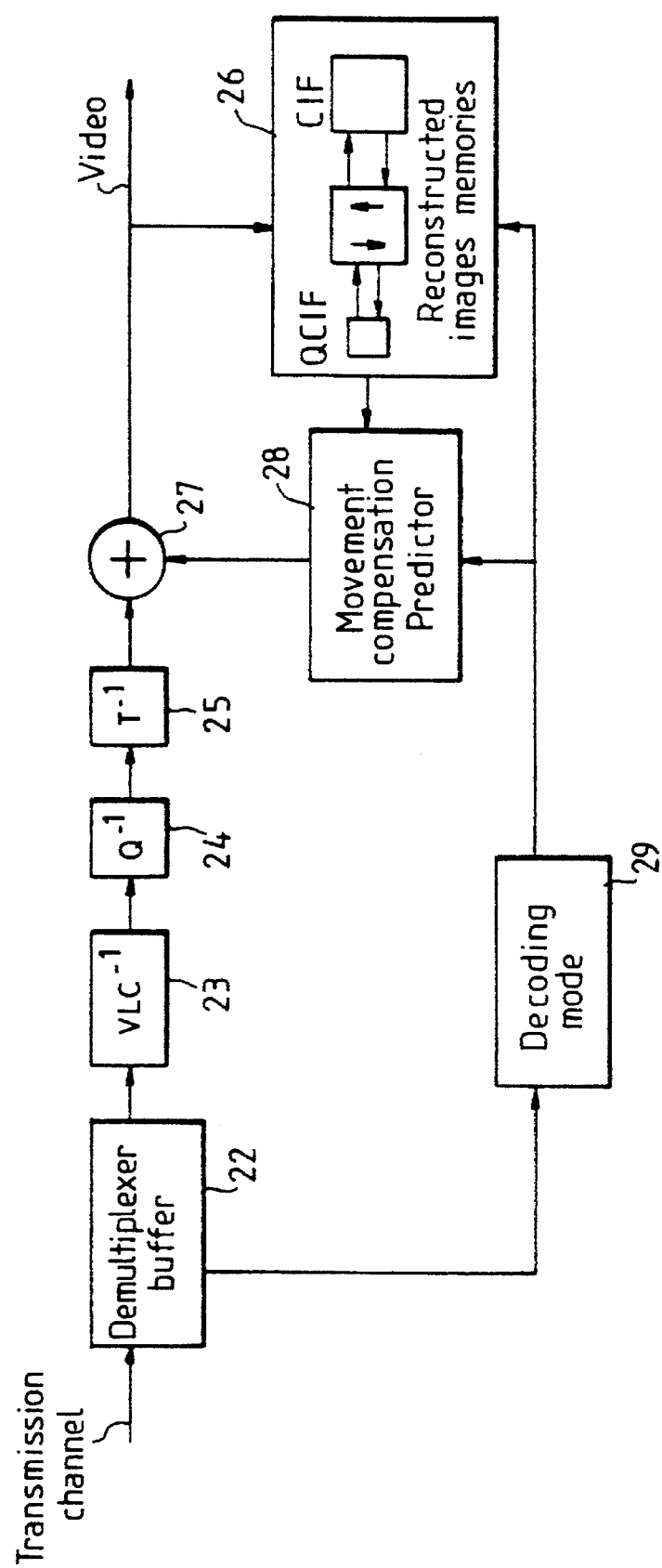
FIG. 2, an embodiment of a decoder according to the invention.

A corresponding decoder is represented in FIG. 2. It includes a buffer memory 22, a variable-length codeword decoder 23 coupled to a dequantification circuit 24 and an inverse cosine transform calculating circuit 25, the elements 22 to 25 being linked in this order in series. It also includes a reconstructed image memory 26. An image reconstruction circuit 27 receives the signal decoded by the elements 22 to 25 on a first input, and, on a second input, the signals read in the memory 26 via a movement compensation device 28. A control device 29 provides control of the movement compensators of the image memory 26 depending on codewords received by the decoder for placing the image reconstruction circuit 27 either in intra-image coding mode or in inter-image coding mode, or in compensated inter-image coding mode.

Naturally, the implementation of the method according to the invention necessitates particular arrangements which are specific to the matter of the size of the buffer memories 12 and 22 for providing data rate regulation in respect of the criteria for standard changing and of the management of the images, between source and reconstructed images.

The size of the buffer memories 12 and 22 must be sufficient to code a QCIF image with five periods and with a data rate, for example, of 16 Kbit/s. This size must, naturally, remain constant for both standards. In fact, for CIF images, the memory capacity may be fixed, in the case of the example, at 3.2 kbit, a quarter image, so as not to increase the transmission time of the images coded to the QCIF format.

So that each new image at the input of the coder can be processed to the QCIF format 30 or to the CIF format 31, the reconstructed image memory 17 is organized so as to contain both formats. For this purpose, the internal loop of the coder includes, as represented in FIG. 1, a QCIF image oversampler 32 for obtaining the corresponding CIF image when the coding takes place to the QCIF format, and a CIF image sub-sampler 33 for obtaining a corresponding image, to the QCIF format, when coding is carried out to the CIF format, the choice of the standard QCIF 30 or CIF 31 images being controlled by a threshold-type control device 21 coupled to the regulation stage 20. The need to permanently hold the two CIF and QCIF image formats in the coding loop is justified by the fact that when there is a change of standard the coder must be able to continue to use the inter-image and movement-compensated prediction modes.

Figure 3:
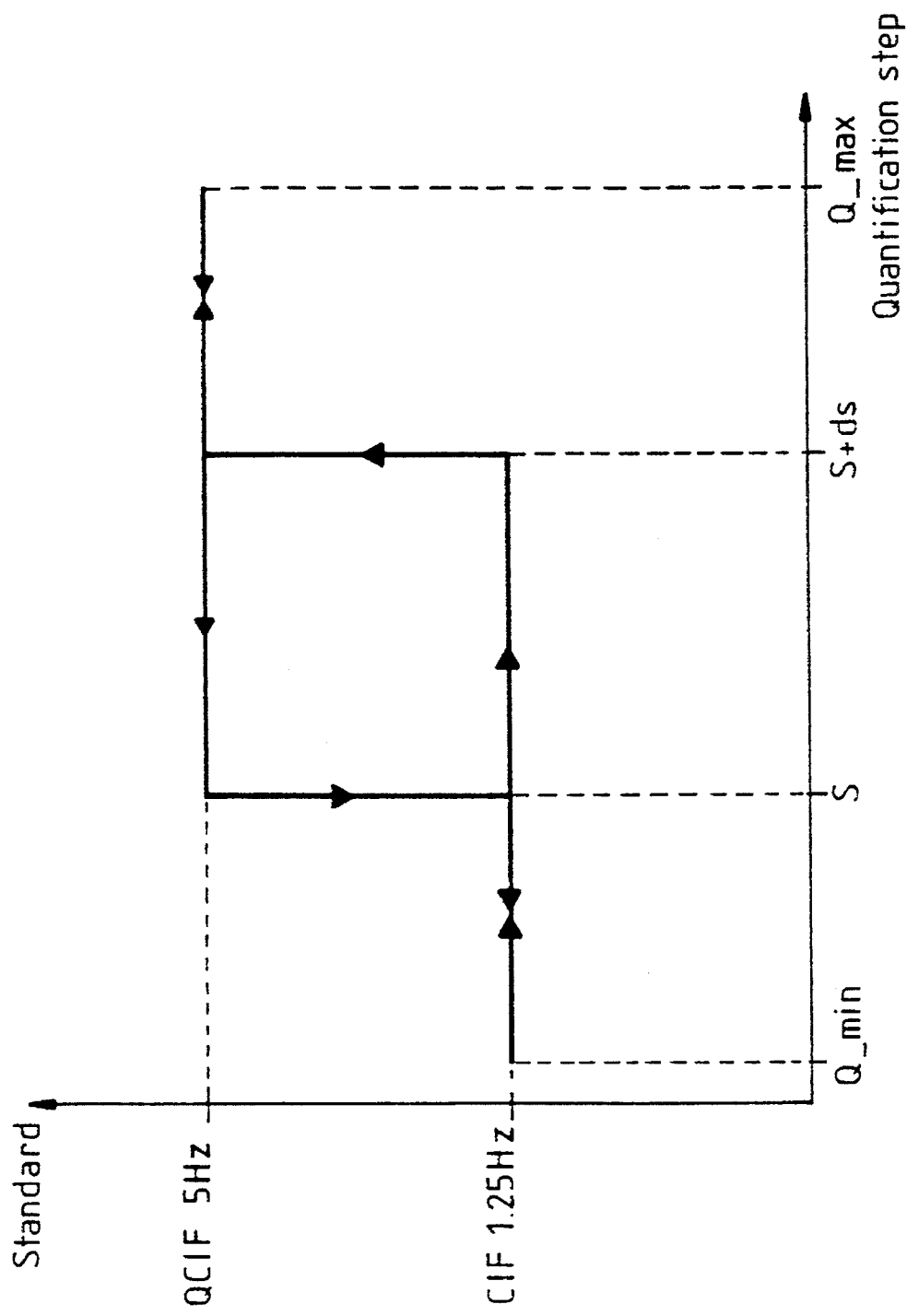
FIG. 3, a graph for illustrating the comparison method employed by the invention for modifying the standard of the images to be coded as a function of the quantification step of the coder represented in FIG. 1.

The criterion for change of standard is based on the consideration of the mean value of the quantification step calculated over an image coded in CIF or QCIF standard. Thus, for low values of mean step it is the CIF standard at 1.25 Hz which is used, the other standard being used for the high values. The decision is taken by the threshold-type control device 21 which carries out the comparison between the mean value obtained with a threshold hysteresis formed by a first threshold S and a second threshold S+dS as represented in FIG. 3. A threshold with hysteresis is used to avoid oscillations occurring upon changes of standards. In the event, once a change to a new standard has been made, the standard changing procedure may be inhibited during the first images in order further to ensure operating stability. In FIG. 3, Q-min designates the minimum value of the quantification step and Q-max designates the maximum value of the quantification step. Once in the CIF standard, for a quantification step which varies between the Q-min step value to the threshold value S+dS, the CIF standard is used. Beyond the threshold S+dS, it is the QCIF standard which is used. Then, in the quantification step range lying between the threshold S and the quantification step Q-max, the coder remains in the QCIF standard. Below the threshold value S the coder comes back into the CIF-standard coding mode. Hysteresis takes place in the threshold range dS within which the coder remains in the current standard.

What is claimed as new and desired to be secured by letters patent of the United States is:

1. Method for dual-standard coding of images at very low data rate, for transmitting images with low spatial Quarter of common Intermediate Format (QCIF) resolution and with high time resolution according to a first standard, or with high spatial Common Intermediate Format (CIF) resolution and low time resolution according to a second standard, wherein the images to be transmitted are coded by means of a coding device including a quantifier circuit for quantifying a prediction error signal into plural quantification steps, comprising:

calculating a mean value of the quantification steps used by the quantifier circuit, comparing the calculated mean value with a first predetermined threshold value and with a second predetermined threshold value higher than the first predetermined threshold value, and, chronologically, coding the images in the first standard when the mean value of the quantification steps is lower than the first predetermined threshold value, then, coding the images in the first standard as long as the mean value of the quantification steps is lower than the second predetermined threshold value, then coding the images in the second standard as long as the mean value of the quantification steps is higher than the second predetermined threshold value, then coding the images in the second standard as long as the mean value of the quantification steps is higher than the first predetermined threshold value, then coding the images in the first standard when the mean value of the quantification steps is lower than the first predetermined threshold value.

2. Method according to claim 1, comprising dividing the images into blocks, calculating a prediction error for each block of a current image, and transforming the prediction error by a cosine transform before quantification.

3. Method according to claim 2, comprising coding quantified data according to a variable-length code.

4. Method according to any one of claims 1 to 3, comprising movement compensating for the prediction error.

5. Method according to any one of claims 1 to 3, wherein the coding device comprises an image predictor, a quantifier, a device for reconstruction of transmitted images, a code allocator as well as a regulation device coupled to a prediction error calculating device via a threshold-type control device for coding the images according to the first or the second standard.

6. Method according to claim 5, comprising a decoding device including a variable-length decoder coupled to a dequantification circuit, the dequantification circuit coupled to an inverse cosine transform calculating circuit, an image reconstruction device coupled, on a first input, to a prediction device controlled according to the first or the second standard and on a second input to the inverse cosine transform calculating circuit.

7. Method according to claim 4, wherein the coding device comprises an image predictor, a quantifier, a device for reconstruction of transmitted images, a code allocator as well as a regulation device coupled to a prediction error calculating device via a threshold-type control device for coding the images according to the first or the second standard.

8. Method according to claim 7, comprising a decoding device including a variable-length decoder coupled to a dequantification circuit, the dequantification circuit coupled to an inverse cosine transform calculating circuit, an image reconstruction device coupled, on a first input, to a prediction device controlled according to the first or the second standard and on a second input to the inverse cosine transform calculating circuit.

\* \* \* \* \*